(12) United States Patent
Phillips et al.

(10) Patent No.: US 11,023,871 B1
(45) Date of Patent: Jun. 1, 2021

(54) AUTHENTICATING A CUSTOMER TO A RISK LEVEL USING AN AUTHORIZATION TOKEN

(71) Applicant: Capital One Services, LLC, McLean, VA (US)

(72) Inventors: Jeremy J. Phillips, Brooklyn, NY (US); Mitchell Miller, Alexandria, VA (US); Saleem Ahmed Sangi, McLean, VA (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 16/697,116

(22) Filed: Nov. 26, 2019

(51) Int. Cl.
| *G06Q 20/10* | (2012.01) |
| *G06Q 20/32* | (2012.01) |
| *G06K 7/14* | (2006.01) |
| *H04L 29/06* | (2006.01) |
| *H04W 12/06* | (2021.01) |

(52) U.S. Cl.
CPC ....... *G06Q 20/1085* (2013.01); *G06K 7/1413* (2013.01); *G06Q 20/3226* (2013.01); *H04L 63/0884* (2013.01); *H04W 12/068* (2021.01)

(58) Field of Classification Search
None
See application file for complete search history.

(56) References Cited

U.S. PATENT DOCUMENTS

| 9,916,736 | B2 | 3/2018 | Block et al. |
| 10,303,869 | B1 | 5/2019 | Duke et al. |
| 10,489,785 | B1* | 11/2019 | Burks ................. G06Q 20/04 |
| 2015/0032625 | A1* | 1/2015 | Dill ........................ H04L 9/32 705/44 |
| 2015/0334099 | A1* | 11/2015 | Zhang ............... H04L 63/0838 726/6 |
| 2016/0078430 | A1 | 3/2016 | Douglas et al. |
| 2017/0243447 | A1* | 8/2017 | Block ................. G07F 19/211 |
| 2019/0073663 | A1 | 3/2019 | Jamkhedkar et al. |
| 2019/0164156 | A1 | 5/2019 | Lindemann |
| 2020/0013073 | A1* | 1/2020 | Bakalis .................. G06K 7/12 |

* cited by examiner

*Primary Examiner* — Joseph W. King
(74) *Attorney, Agent, or Firm* — Sterne, Kessler, Goldstein & Fox P.L.L.C.

(57) ABSTRACT

Disclosed herein are system, method, and computer program product embodiments for authenticating a mobile user via an authentication method determined based on a token level associated with the action being completed. An authentication token is created corresponding to the token level and the authentication token is sent to the mobile device. This authentication token may be used to authenticate subsequent actions and engage various services to complete the actions using application programming interfaces. The authentication token stored on the mobile device obviates the need for a user to authenticate multiple times to complete actions requiring a similar token level. The system may authenticate the identity of the mobile user using various authentication methods.

20 Claims, 10 Drawing Sheets

FIG. 2C

Choose Amount

Get cash from:
Checking Account....0987
$11,435.12 Available

Amount:
$20

Choose Amount                Done $20
$40
$60

FIG. 2D

Confirm Details

Get cash from:
Checking Account....0987
$11,435.12 Available

Amount:
$60

Confirm Details

AUTHENTICATING A CUSTOMER TO A RISK LEVEL USING AN AUTHORIZATION TOKEN

BACKGROUND

Increasingly, bank account holders conduct banking transactions via mobile device applications. From a mobile application, account holders may perform many different types of banking transactions, such as checking balances, transferring funds, and viewing statements. However, occasionally, bank account holders must visit an Automated Teller Machine (ATM) or a bank teller to finalize transactions that cannot be completed on the mobile application, such as performing a cash withdrawal.

Banks must protect against various forms of bank fraud to defend stored assets and maintain the confidence of account holders. Transactions performed on a mobile device application and at ATMs are especially susceptible to fraud and artifice. Thus, banks take special care to vet and authenticate mobile transactions.

BRIEF DESCRIPTION OF THE DRAWINGS

The accompanying drawings, which are incorporated herein and form a part of the specification, illustrate embodiments of the present disclosure and, together with the description, further serve to explain the principles of the disclosure and to enable a person skilled in the arts to make and use the embodiments.

FIGS. 2A through 2J illustrate wireframes of mobile device interactions with a cardless ATM system including authentication processes, in accordance with an embodiment.

In the drawings, like reference numbers generally indicate identical or similar elements. Additionally, generally, the left-most digit(s) of a reference number identifies the drawing in which the reference number first appears.

DETAILED DESCRIPTION

Figure 1:
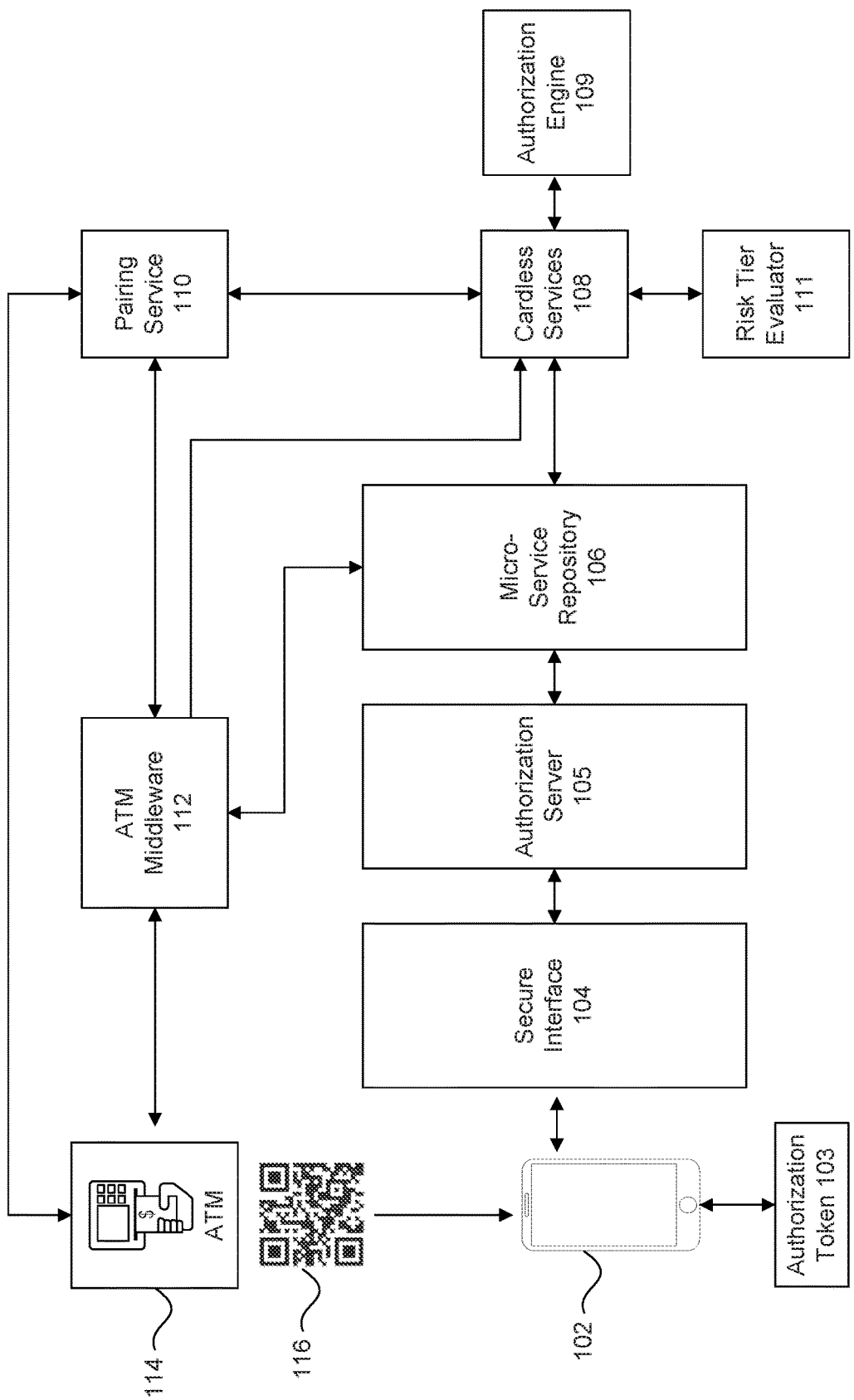
FIG. 1 is a block diagram of a cardless ATM system, in accordance with an embodiment.

Provided herein are system, apparatus, device, method and/or computer program product embodiments, and/or combinations and sub-combinations thereof, for authenticating a mobile user to a token level, creating an authorization token corresponding to the token level, and using the authorization token to authenticate the user's subsequent actions.

A bank may offer a mobile application experience that allows account holders to conduct a variety of banking transactions via a mobile device. For example, an account holder may use a mobile banking application to check account balances, change their user information, transfer funds between accounts, pay bills from stored funds, etc. As part of the mobile application experience, the bank may provide a cardless ATM feature. Through a cardless ATM system, an account holder may create via the mobile application a queued transaction to perform at an ATM, e.g., a cash withdrawal. Then, the account holder may visit an ATM, scan a barcode or other suitable signifier at the ATM using the mobile device to authenticate themselves (as opposed to authenticating with an ATM card and PIN number), and complete the transaction at the ATM.

Certain actions performed by an account holder using a mobile banking application or cardless ATM system may require heightened security levels. For example, an account holder seeking to request a loan, close an account, withdraw a large amount of funds, deposit a check, conduct a wire transfer, etc., may be subject to additional steps to verify their identity to protect against fraudulent transactions and preserve system integrity. In legacy systems, account holders completing such actions may need to visit a teller to provide appropriate documentation, confirm their identity, and complete the transaction. Moreover, requested actions may invoke a variety of services (e.g., in a micro-service repository or provided by ancillary systems) to perform the functionality. The extent to which an account holder needs to be authenticated may vary according to the requested action. In legacy systems, to complete multiple actions, a customer may have to authenticate multiple times across multiple services, which may be frustrating to users, cause additional data security risks, and consume available system resources.

Accordingly, a need exists to authenticate a user to a token level, create an authorization token corresponding to the token level, and use the authorization token to authenticate the user's subsequent actions. An account holder may perform various authentication methods on their mobile device to verify their identity, store the authorization token on their mobile device, and subsequently perform actions allowable under that token level. In this fashion, the account holder may satisfy the heightened security requirements for a particular transaction without re-authenticating or visiting a bank teller. A further technical benefit is realized by using the token level, the user's past behaviors, and a host of other factors to determine the requisite token level needed to complete a particular action that is tailored to the user. Some embodiments may determine a secondary authentication method and authenticate the identity of the mobile user using this secondary authentication method and update the authorization token accordingly.

By determining an authentication method based on a token level and creating an authorization token stored on the mobile device, a user only needs to be authenticated one time to perform allowed actions, i.e., actions performable by a user having that token level. This improves system performance overall by reducing the amount of redundant authentication-related tasks that are performed, saving system resources such as memory and CPU. This provides a further technical benefit of providing a more secure system that allows organizations to divide their technical landscape into APIs and micro-services across functional lines—in legacy systems, authentication functions would otherwise need to be performed by the same module and/or in the same security context to be considered valid. Thus, embodiments improve the security banking and ATM transactions and minimize inconveniences to the customer, heightening the user experience for account holder using a mobile banking application and cardless ATM system.

FIG. 1 is a block diagram of a cardless ATM system 100, in accordance with an embodiment. Any operation herein may be performed by any type of structure in the diagram, such as a module or dedicated device, in hardware, software, or any combination thereof. Any block in the block diagram of FIG. 1 may be regarded as a module, apparatus, dedicated device, general-purpose processor, engine, state machine, application, functional element, or related technology capable of and configured to perform its corresponding operation(s) described herein. Cardless ATM system 100 may include mobile device 102, authorization token 103, secure interface 104, authorization server 105, micro-service repository 106, cardless services 108, authorization engine 109, pairing service 110, ATM middleware 112, ATM 114, and matrixed identifier 116.

Mobile device 102 may be a personal digital assistant, netbook, tablet, smart phone, mobile phone, smart watch or other wearable, appliance, part of the Internet-of-Things, and/or embedded system, to name a few non-limiting examples, or any combination thereof. In other embodiments, mobile device 102 may be a desktop workstation, laptop or notebook computer, or other suitable computing device. Mobile device 102 may be used by an account holder of a banking institution to conduct online banking, e.g., check account balances, transfer funds, and perform a litany of other banking-related transactions. Mobile device 102 may have a mobile application installed thereon and may be used to interact with a banking institution to perform banking transactions on/with/towards the account holder's accounts. In an embodiment, mobile device 102 may store an authorization token, described below as authorization token 103, locally that indicates a token level to which mobile device 102 is authenticated to perform actions.

Authorization token 103 may be stored by mobile device 102 to allow a mobile device user on a mobile application running on mobile device 102 to perform various actions in a mobile banking application, e.g., withdrawing funds, transferring funds, cashing checks, etc. Authorization token 103 may be an access token that allows an account holder to make API requests and perform other actions within a technical infrastructure. In an embodiment, authorization token 103 may be a string representing an authorization issued to mobile device 102 that is opaque to the user of mobile device 102. Authorization token 103 may confidentially store and facilitate transmission of authentication credentials related to the account holder without requiring a login and password or additional authentication steps. In an embodiment, authorization token 103 may be an OAuth 2.0 access token. Authorization token 103 may be issued by and subsequently verified by authorization server 105, described in further detail below, or verified by resource services in a technical landscape, e.g., micro-services in micro-service repository 106. In some embodiments, authorization token 103 may be specific to services accessed by a banking system, i.e., more than one authorization token 103 may be created and stored on mobile device 102 for the services access by mobile device 102. In some embodiments, authorization token 103 may include a timestamp or date that indicates the expiration of the token, e.g., authorization token 103 may only be valid for a limited period of time, e.g., for higher token levels required by actions requiring a higher risk tier.

Secure interface 104 may facilitate interactions between mobile device 102, the banking institution, micro-service repository 106, and other APIs in accordance with an embodiment. Secure interface 104 may provide facilities to allow various system components, including mobile device 102, to securely communicate with a banking institution's backend systems to conduct transactions while protecting the banking institution's backend systems from improper access attempts, e.g., distributed denial of service (DDoS) attacks, injection attacks, etc. Secure interface 104 may harness and leverage various communication standards and protocols, e.g., TLS, SSL, HTTP, HTTPS, etc., to further communication between various components in cardless ATM system 100 and backend banking systems.

Authorization server 105 may protect services in micro-service repository 106 and/or cardless services 108 such that only authenticated users can access APIs provided by services in these locations. Authorization server 105 may issue authorization token 103 to mobile device 102 in response to a successfully performed authentication method. In some embodiments, authorization server 105 may facilitate subsequent interactions between mobile device 102 and micro-service repository 106, cardless services 108, and other services used in a banking application's technical landscape by re-authenticating a client based on issued authentication tokens. In one embodiment, authorization server 105 may be an OAuth 2.0 Authorization Server. In another embodiment, authorization server 105 may be deployed as a micro-service within micro-service repository 106.

Micro-service repository 106 may provide a variety of micro-services that furnish capabilities within cardless ATM system 100. To provide these functionalities, micro-service repository 106 may employ suitable lightweight network protocols, e.g., HTTP, and provide specific, tailored functions, modules, messaging protocols, etc. to actors and software modules within cardless ATM system 100. For example, micro-service repository 106 may broker authentication-related interactions between an account holder on mobile device 102 and authorization engine 109. In an embodiment, micro-service repository 106 may provide functions and methods that allow mobile device 102 to interact with ATM 114 without using a physical ATM card to authenticate the account holder. Micro-service repository 106 may provide various micro-services that may require a token level, i.e., an extent to which a user has been previously authenticated towards the performance of actions that are assigned risk tiers, to determine whether a user may perform a function/action provided by the micro-service.

Cardless services 108 may provide a wide-array of services, APIs, functions, etc. that allow various actions and transactions to be performed in a cardless ATM system from a mobile application running on mobile device 102. In response to a request to perform an action, cardless services 108 may determine a risk tier associated with the action. Based on this risk tier, cardless services 108 may determine if a received authentication token has a token level sufficient to perform the action. If the token level is insufficient, cardless services 108 may determine an authentication method needed to attain an appropriate token level and engage authorization engine 109 to further authenticate the user and authorization server 105 to issue an updated authentication token 103 to mobile device 102 when the second authentication method is completed. After re-issuing authorization token 103, cardless services 108 may allow other actions to be performed that require a similar token level.

For example, cardless services 108 may pair a queued withdrawal transaction to ATM 114 via pairing service 110. In this example, a mobile application running on mobile device 102 may scan a matrixed identifier displayed on a display of an ATM, decode an identifier for the ATM encoded in the matrixed identifier, and send the identifier to pairing service 110 via cardless services 108. Cardless services 108 may subsequently direct ATM 114 to complete the queued withdrawal transaction without requiring additional authentication by verifying the token level of authorization token 103. Cardless services 108 may create and store a variety of such queued transactions performable within cardless ATM system 100. Since an authenticated account holder is known to the banking institution as having proper access to perform transactions of a similar risk tier via authorization token 103, cardless services 108 may inform ATM 114 that the authenticated user may complete the transaction at ATM 114. This eliminates the requirement that an account holder authenticate again prior to engaging ATM middleware 112 to complete the cardless ATM withdrawal. In another embodiment, an authenticated account holder on mobile device 102 may request a transaction through cardless services 108 that needs to be secondarily authenticated at ATM 114. In such an embodiment, cardless services 108 may receive additional geospatial or biometric data or a scan of a government identification card from ATM 114 and compare it to stored data to provide an on-site secondary authentication method. Cardless services 108 may then engage authorization server 105 to issue an updated authorization token 103 corresponding to the raised token level. Authorization token 103 may expire when a timestamp is reached. For example, higher token levels may expire more quickly than lower token levels given the higher risk tier associated with high token levels.

Cardless services 108 may calculate a drainage indicator and a velocity indicator to consider in determining the risk tier. Cardless services 108 may consider the drainage, i.e., a total value of recent withdrawals to formulate a drainage indicator. Cardless services 108 may consider the velocity, i.e., a count of recent withdrawals to formulate a velocity indicator. For account holders with high velocity/drainage indicators, heightened risk tiers may be assigned to actions. For example, an account holder that is conducting a large number of small transactions may have a high velocity, and a heightened risk tier may be assigned to future withdrawals. Similarly, an account holder that has withdrawn a large amount of funds recently may have a high drainage indicator, and a heightened risk tier may be assigned to future withdrawals. Accordingly, actions performed by such users may require a higher token level within a transmitted authorization token 103 to complete the action without secondarily authenticating.

Authorization engine 109 may provide authentication-based services, API calls, rules-engines, and other suitable constructs that authenticate account holders on mobile applications when performing actions in cardless ATM system 100. For example, authorization engine 109 may allow an account holder to authenticate themselves to the banking institution using a first authentication method from a mobile application installed on mobile device 102. Such an authentication method may involve entering a username and password. Authorization engine 109 may compare the received username and password combination to stored, encrypted, account information to verify the account holder's identity.

In response to the authentication methods performed by authorization engine 109, cardless services 108 may determine a token level and engage authorization server 105 to issue authorization token 103 to mobile device 102. The token level may be an indication of the degree to which the account holder has been authenticated, i.e., a level of certainty that the account holder is the transactor and a risk tier to which the account holder may transact. As authorization engine 109 authenticates the user via additional, secondary authentication methods, a user's token level may be elevated, increased, or incremented. An authorization token having a higher token level may be able to complete actions associated with higher risk tiers, whereas authorization tokens with lower token levels may not be able to complete actions that are assigned higher risk tiers. For example, an account holder that logged into their account using a login and password may receive an authorization token indicative of a token level one. For example, having token level one, the authenticated account holder may be able to view account balances, transfer funds between accounts, and perform other low risk actions. However, if the token-level-one account holder attempts to perform an action mandating a higher risk tier, then a secondary authentication method may need to be performed. After authorization engine 109 successfully authenticates the account holder using the secondary authentication method, the account holder may receive an updated authorization token indicative of the higher level, and may thus be able to perform other higher-risk transactions. In an embodiment, the elevated token level may remain in effect for a certain amount of time, e.g. 30 minutes, 1 day, etc., and the time length may vary based on the token level. When that time expires, authorization engine 109 may reduce or decrement the token level, return the token level back to level one or zero, or perform other suitable actions Authorization engine 109 may also facilitate the performance of secondary authentication methods. For example, authorization engine 109 may process biometric and geospatial information, generate one-time passcodes, pose security questions, process government identification scans, and perform other suitable secondary authentication methods. For example, authorization engine 109 may use the scanning of a matrixed identifier at an ATM as evidence of the location of mobile device 102 and compare this geospatial information against information associated with the account holder. A skilled artisan will appreciate that a variety of additional authentication mechanisms may be employed at mobile device 102 to ensure that the user is authorized to access their specific account through cardless services 108. Additional description of the secondary authentication methods conducted by authorization engine 109 is provided below with reference to FIG. 4.

Pairing service 110 may be employed by cardless services 108 to pair a transaction to ATM 114. With pairing completed by pairing service 110, cardless services 108 may issue a request to ATM 114 to perform a specific transaction (e.g., providing cash to complete a cash withdrawal transaction) and instructions may be provided through ATM middleware 112 to direct the behavior of ATM 114. In accordance with an embodiment, pairing service 110 may pair transactions from mobile device 102 with ATM 114 in response to the reception of an ATM identifier, which can be derived by a mobile application running on mobile device 102 by scanning a matrixed identifier displayed on ATM 114. For example, ATM 114 may display a barcode, such as matrixed identifier 116, on a display screen. This barcode may encode or otherwise include an identifier associated with ATM 114. When mobile device 102 prepares a transaction for performance through cardless services 108, the mobile application executing on mobile device 102 may instruct the authenticated user to visit ATM 114 to complete the transaction. A skilled artisan will recognize that, although the disclosure herein is presented principally by way of barcodes (which include special cases of barcodes), other forms of coding may be used in place of barcodes to equivalent effect.

Risk tier evaluator 111 may be employed by cardless services 108 to assign risk tiers to performable actions within cardless ATM system 100. A risk tier may attribute a level of risk, danger, urgency, gravity, etc. with an action that may be used to determine the token level needed to complete the action. For instance, risk tier evaluator 111 may assign certain actions a low risk tier, e.g., checking balances, viewing statements, or visiting a frequently-asked questions page on the mobile application. For such actions, authentication via a login/password may suffice. Risk tier evaluator 111 may assign other actions a mid-level risk tier, e.g., transferring funds between accounts, completing cash withdrawals, and cashing checks. Risk tier evaluator 111 may assign still other actions a high risk tier, e.g., closing an account, withdrawing a large amount of funds, and conducting a wire transfer. For mid-level and high-level risk tiers, additional steps to verify the identity of the account holder may be required. The above list of actions and risk tiers is not exhaustive, however, and only provides an exemplary illustration. Risk tier evaluator 111 may assign risk tiers quantitatively, e.g., assign an integer, decimal, etc., or qualitatively, e.g., alphabetical grades, low/medium/high, etc.

Moreover, risk tier evaluator 111 may consider a variety of user-specific factors and details in determining a risk tier for an action, such as past behaviors, account settings, the current token level transmitted by an account holder, etc. For example, risk tier evaluator 111 may customarily assign an action of withdrawing two-hundred dollars from an ATM a mid-level risk tier. However, where an account holder withdraws two-hundred dollars every Sunday from the same ATM, a subsequent Sunday request to withdraw two-hundred dollars from that same account holder may be assigned a lower risk tier and thus require a lower token level in authorization token 103.

Figure 2A:
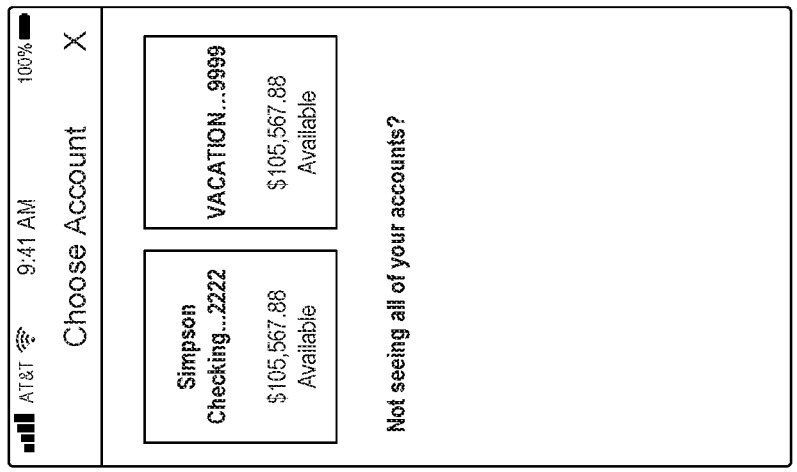
Figure 2B:
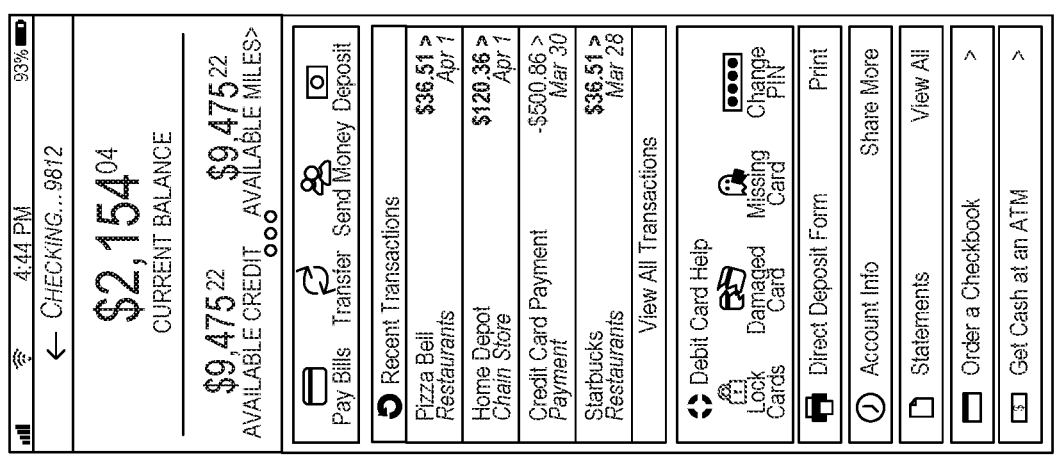
Figure 2F:
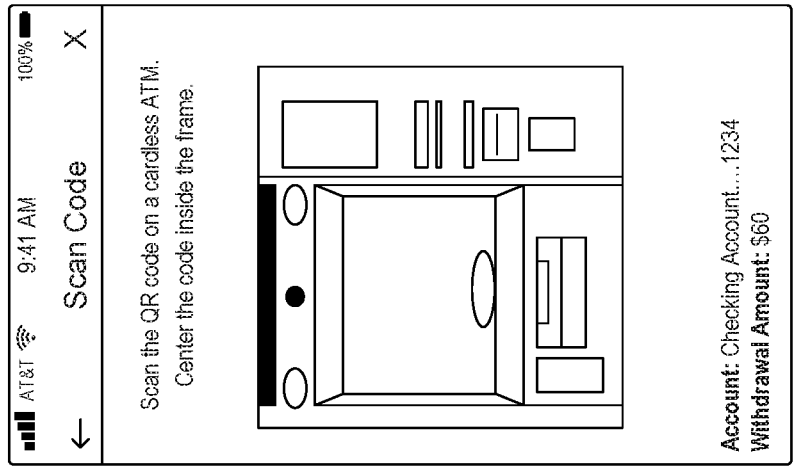
Figure 2E:
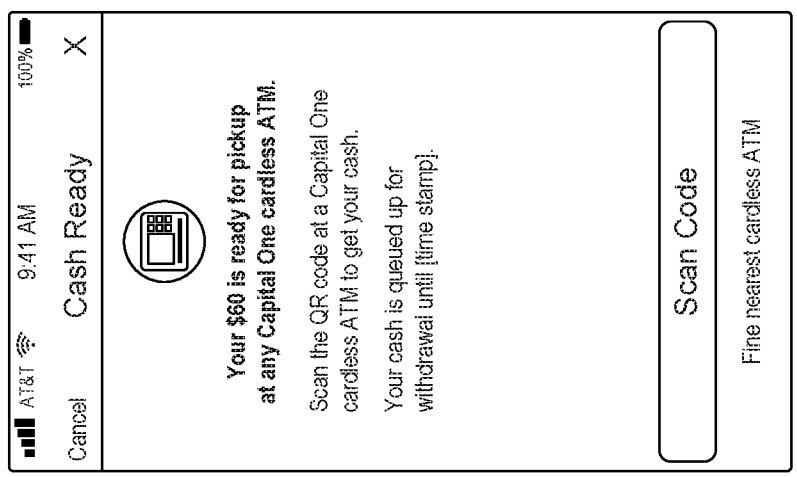
Figure 2H:
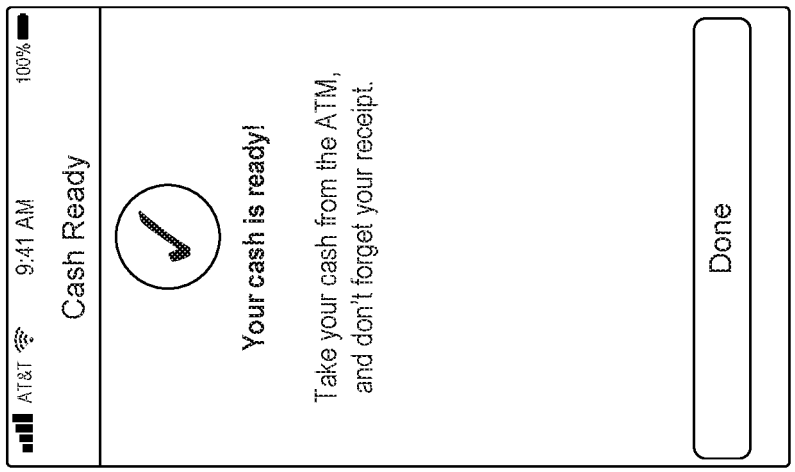
Figure 2G:
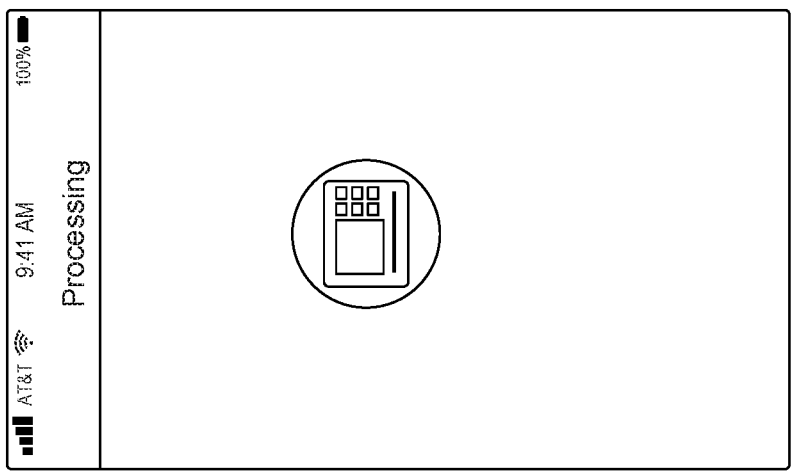
Figure 2J:
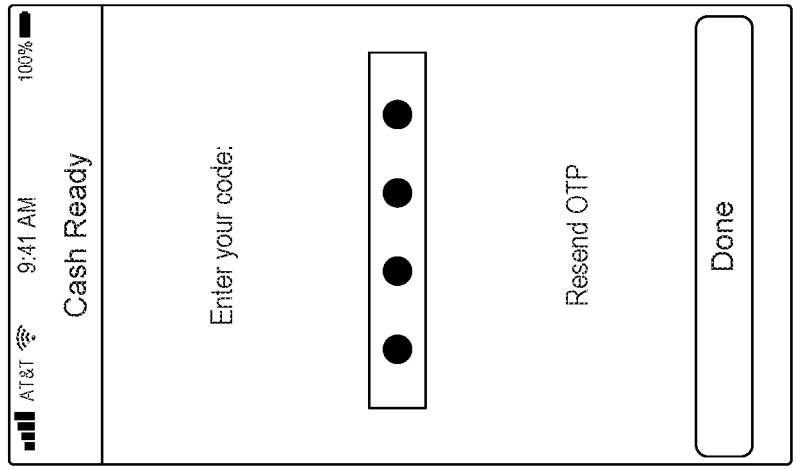
Figure 2I:
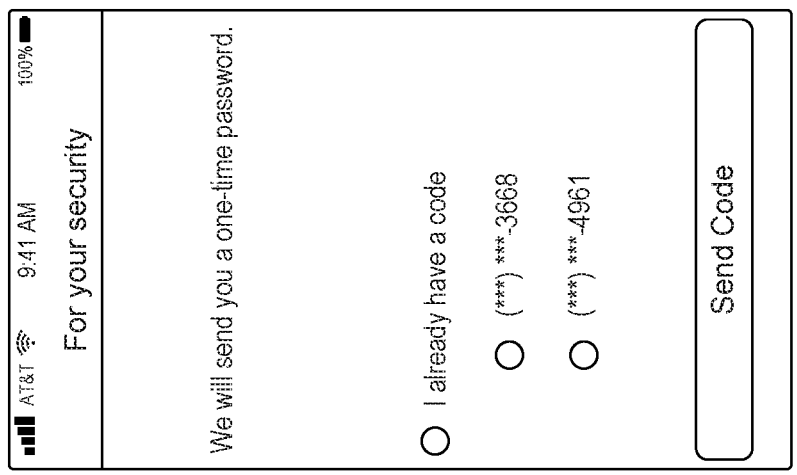

FIGS. 2A through 2J illustrate wireframes of mobile device interactions with a cardless ATM system including a one-time passcode authentication process, in accordance with an embodiment. These wireframes are merely exemplary, and one skilled in the relevant art(s) will appreciate that many approaches may be taken to provide mobile applications in accordance with this disclosure. FIGS. 2A-2E illustrate a process of preparing a transaction for fulfillment at ATM 114. FIGS. 2F-2H illustrate a process of pairing the specific ATM 114 to a transaction of mobile device 102 by scanning matrixed identifier 116 using mobile device 102. FIGS. 2I and 2J illustrate the reception and entering of a one-time passcode, i.e., one form of secondary authentication provided via authorization engine 109.

FIG. 2A shows an exemplary home screen for a mobile application used for banking from a mobile device, such as mobile device 102 of FIG. 1. From this screen, an account holder using the mobile application may commence a multitude of transactions and perform a variety of actions that are associated with risk tiers and require sufficient token levels. For example, an account holder may queue a transaction at an ATM by clicking "Get Cash at an ATM." An account holder may click the "Transfer" icon to transfer funds between accounts. Or an account holder may click "Change PIN" to change their ATM PIN number. Each action may be associated with a different risk tier and may require a sufficient token level.

FIG. 2B shows an exemplary screen allowing the account holder to select an account from which to perform an ATM withdrawal. FIG. 2B displays a screen presented in the mobile application after an account holder selects the "Get Cash at an ATM" option in FIG. 2A.

FIG. 2C shows an exemplary screen for selecting an amount for the ATM cash withdrawal. FIG. 2D shows an exemplary screen for confirming details of the withdrawal including the account and the amount selected. FIG. 2E shows an exemplary screen notifying the user that the transaction has been approved and is ready to be completed at an ATM. This screen also provides an option allowing the user to scan a matrixed identifier at an ATM, which, once selected, navigates to the exemplary screen of FIG. 2F. FIG. 2G shows a camera feature allowing the user to approach the ATM with their mobile device to scan the matrixed identifier shown on the ATM display. FIG. 2H shows a confirmation screen indicating that the transaction has been completed by the ATM.

FIGS. 2I and 2J show the reception and entering of a one-time passcode, i.e., one secondary authentication method provided by authorization engine 109. Such a secondary authentication method may be selected by authorization engine 109 in response to an action performed by the account holder on mobile device 102. For example, an account holder may select an action of "Get Cash at an ATM" as depicted above in FIG. 2A. In an embodiment, risk tier evaluator 111 may assign this action a medium risk tier, especially if it is the first time that the account holder has selected this option in the mobile experience. For other account holders, risk tier evaluator 111 may assign a different risk tier. Authorization engine 109 may then determine, based on the medium risk tier that a secondary authentication method is necessary and that verifying a one-time passcode will elevate the token level for the account holder to satisfy a medium risk tier. Authorization engine 109 may settle on the one-time passcode as the appropriate secondary authentication method based on a variety of factors including user preferences, past user behaviors, technical capabilities of mobile device 102, and other suitable considerations. FIG. 2I shows a one-time passcode screen sent to an account holder upon a determination that a secondary authentication method is needed to complete the desired transaction. FIG. 2J shows a screen by which the account holder may enter the received one-time passcode to secondarily authenticate their identity.

Figure 3:
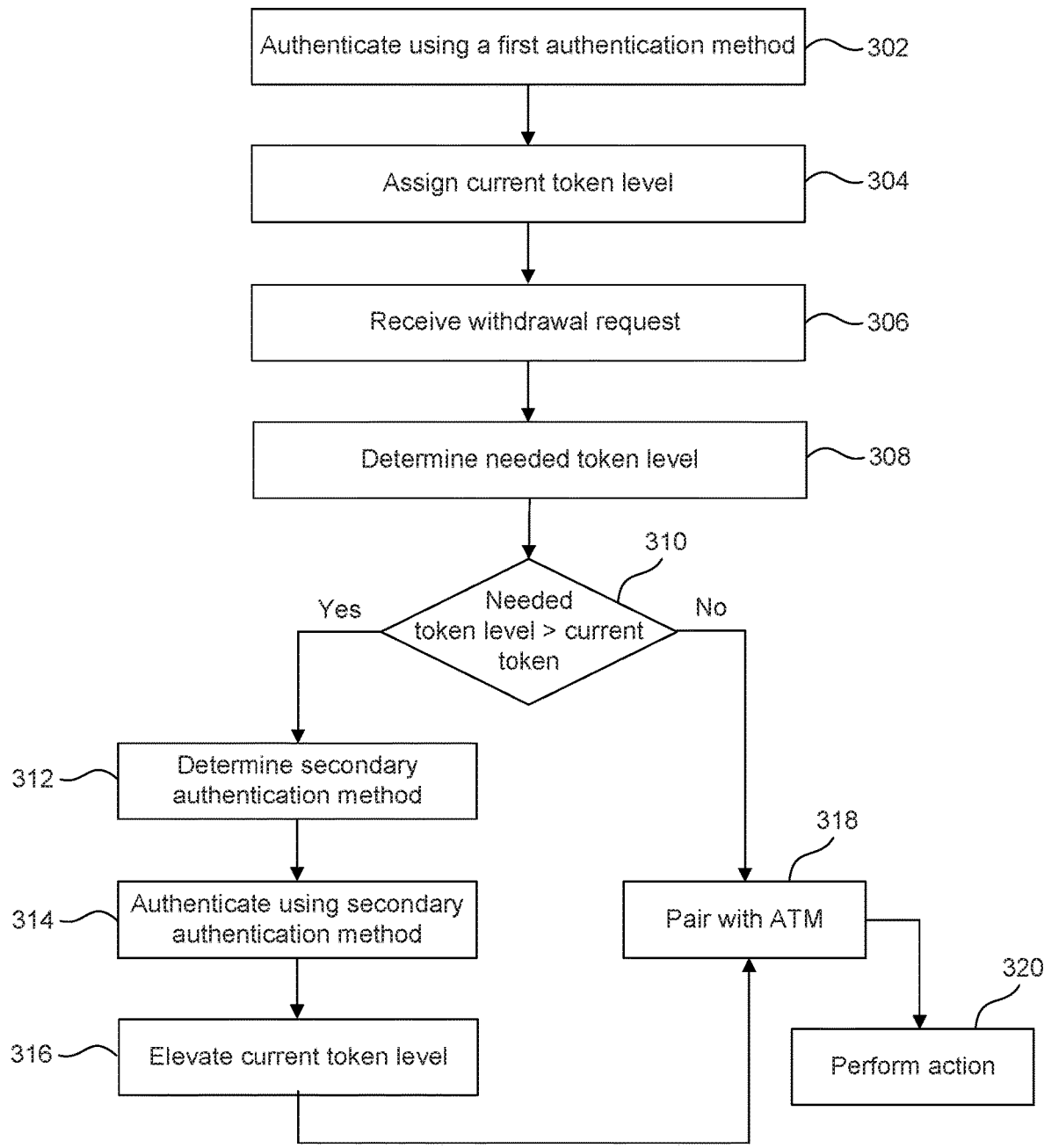
FIG. 3 is a flowchart illustrating a method of authenticating a user to perform a cardless ATM withdrawal, in accordance with an embodiment.

FIG. 3 illustrates a method 300 of authenticating a user to perform a cardless ATM withdrawal. Method 300 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 3, as will be understood by a person of ordinary skill in the art(s).

In 302, authorization engine 109 may authenticate an account holder logging into a mobile banking application on mobile device 102. Authorization engine 109 may receive a login and password from mobile device 102 and compare the received password to stored, encrypted passwords associated with the account holder. If the received login and password match, then the account holder may be considered authenticated via the first authentication method. In other embodiments, authorization engine 109 may authenticate the account holder using biometric data, e.g., fingerprint or eye scans, or other suitable authentication methods.

In 304, cardless services 108 may determine an initial token level to be associated with the authenticated user and engage authorization server 105 to issue authorization token 103 having the token level to mobile device 102. For example, cardless services 108 may determine an initial token level of one, indicating that the account holder may perform low risk actions such as viewing balances and statements. In some instances, cardless services 108 may assign a higher initial token level to the authenticated user. For example, if an account holder recently completed a secondary authentication method (as described below), the account holder may retain the higher token level when the account holder completes the first authentication method. Authorization token 103 may be stored on mobile device 102 for submission in subsequent requests.

In 306, cardless services 108 may receive a request to withdraw funds using a cardless ATM system from mobile device 102 via secure interface 104. The received request from mobile device 102 may include authorization token 103 transmitted to mobile device 102 in 302 upon a successful initial authentication.

In 308, cardless services 108 may employ risk tier evaluator 111 to determine a token level needed to complete the withdrawal. Risk tier evaluator 111 may determine the token level required by grouping actions into risk tiers, with lower risk tiers indicating lower security requirements than higher actions. For example, if the account holder is closing the account, cardless services may determine that the highest token level is needed, for example, a token level of three. Cardless services 108 may consider the account holder's past behaviors in determining the token level. For example, if the account holder recently completed similar actions, a lower risk tier may be assigned to the action and/or a lower token level ultimately determined.

In 310, authorization engine 109 may determine if the token level needed to perform the cardless ATM withdrawal is greater than the token level indicated in the authorization token 103 received in 306. If the token level needs to increase, then method 300 proceeds to 312. Otherwise, method 300 proceeds to 318.

In 312, cardless services 108 may determine an appropriate secondary authentication method needed to complete the action received in 306 based on the risk tier, token level, and stored information about the account holder, including the account holder's past behaviors. In some embodiments, cardless services 108 may present to the account holder one or more secondary-authentication options to choose from that will achieve the requisite token level. For example, cardless services 108 may allow a mobile user to choose between scanning the government identification card and answering previously configured security questions.

In 314, cardless services 108 may engage authorization engine 109 to authenticate the account holder using the determined secondary authentication method. A number of such secondary authentication methods are characterized below with reference to FIG. 4. If the account holder satisfies the secondary authentication method, then method 300 may proceed to 316.

In 316, cardless services 108 may employ authorization server 105 to issue an updated authorization token indicating the higher token level. Cardless services 108 may determine the new token level based on the secondary authentication method performed in 314. For example, if authorization engine 109 performed a scan and verification of a governmental identification, then the highest token level may be assigned. This elevated token level may be used to authenticate the user to perform subsequent actions based on the token level indicated in authorization token 103.

At 318, an account holder with mobile device 102 running a mobile application may approach ATM 114 and scan a matrixed identifier at the ATM using the mobile application. Such a matrixed identifier may encode or otherwise include an identifier associated with the ATM. As previously discussed, this matrixed identifier may be, for example, a matrixed identifier, although a skilled artisan would appreciate that other methods of encoding an identifier for the ATM may be used and other methods of transmitting the same to the mobile app may also be used. In other embodiments, mobile device 102 may complete an action that does not require pairing the transaction to an ATM, in which embodiments, the pairing step of 318 need not be performed. In other embodiments, the pairing of a transaction with ATM 114 may itself provide a secondary authentication method. For example, the account holder may subsequently provide an ATM card/PIN number, biometric data, or other confirmation at ATM 114 to secondarily authenticate and complete the transaction in the mobile application or on the screen display for ATM 114.

At 320, cardless services 108 may request processing of a queued transaction at the ATM associated by employing ATM middleware 112. For example, ATM middleware 112 may direct ATM 114 to complete a withdrawal transaction for an authenticated user. Cardless services 108 may interact with backend banking systems in a variety of other ways to complete transactions that are not dependent on a particular ATM, e.g., transferring funds. Moreover, backend banking systems, services in micro-service repository 106, and other services may leverage the exposed token level to verify that the account holder has permission to perform various actions performable on the backend banking systems and other services. In this fashion, a secondary authentication method may be provided to an account holder that is tailored to the action that account holder aims to complete. This allows account holders engaging with the mobile experience to complete applications on the mobile application that they could not previously complete without physically providing identity verification to a teller at a bank. The authentication is then preserved within cardless services 108 as a token level, which can be exposed or passed to services to allow the user to proceed with actions without authenticating twice. Additionally, a banking system may deploy a micro-service architecture to better meet functional goals.

Figure 4:
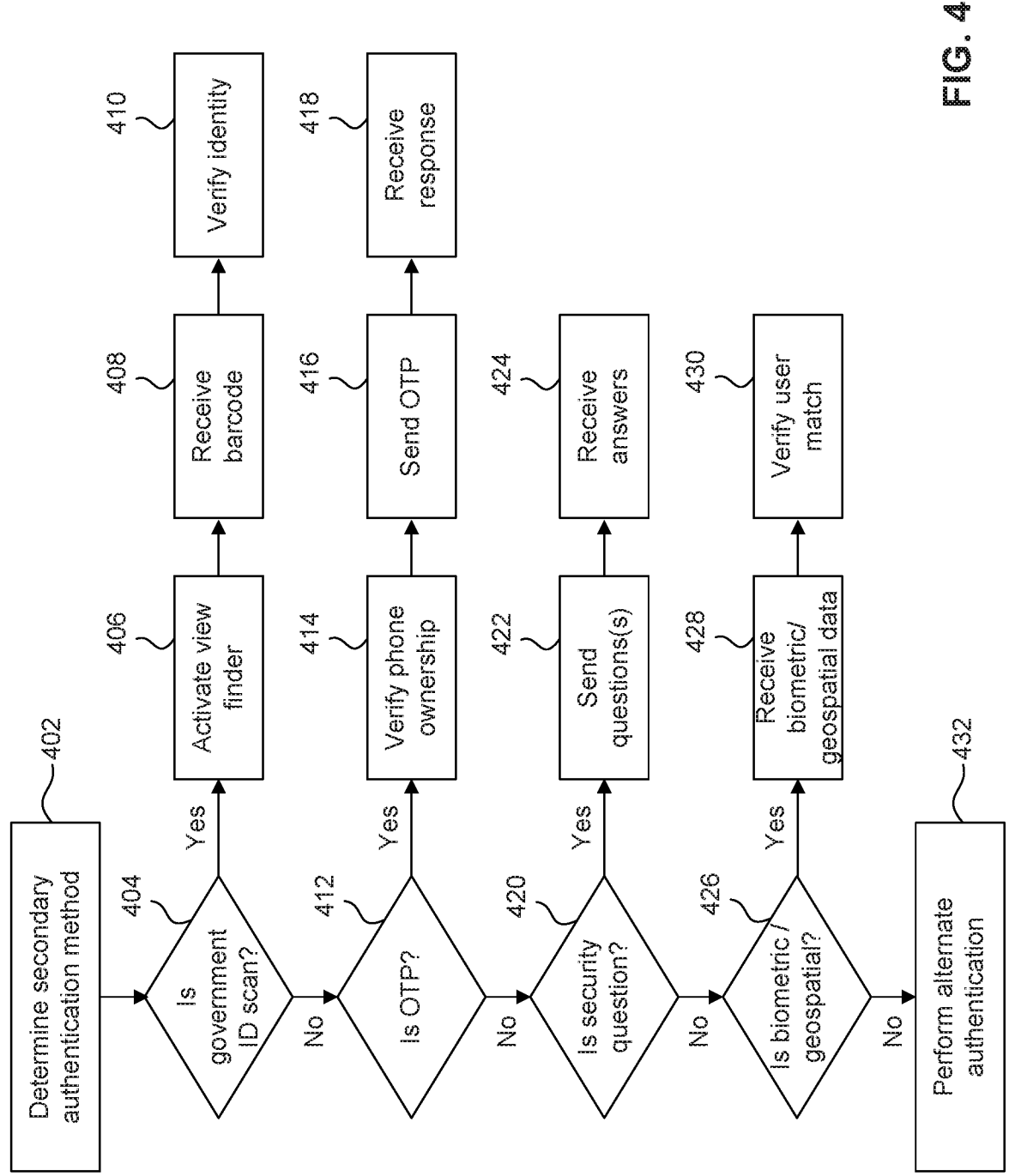
FIG. 4 is a flowchart illustrating a method of providing a secondary authentication method to a mobile device in a cardless ATM system, in accordance with an embodiment.

FIG. 4 illustrates a method 400 of providing a secondary authentication method to a mobile device in a cardless ATM system, in accordance with an embodiment. Method 400 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 4, as will be understood by a person of ordinary skill in the art(s).

In 402, cardless services 108 may determine an appropriate secondary authentication method needed to complete an action from an account holder on a mobile application. As described above with reference to FIG. 3, the determination may be determined on the risk tier associated with the action, the current token level, past user behaviors and other stored information, and a variety of other suitable factors.

In 404, cardless services 108 may engage authorization engine 109 to determine if the secondary authentication method determined in 402 requires the scanning and verification of a government identification card. If yes, then method 400 proceeds to 406. Otherwise, method 400 proceeds to 412.

In 406, authorization engine 109 activates a view finder on mobile device 102 via secure interface 104 and/or a service in micro-service repository 106. The view finder may display on the screen display of mobile device 102 and activate a camera available on mobile device 102. The account holder may then frame a picture of a valid governmental identification card that includes a barcode. In an embodiment, the account holder may press a button on mobile device 102 to take a picture of the governmental identification card. In an alternate embodiment, authorization engine 109 may cause mobile device 102 to optically locate a barcode on the governmental identification card and cause mobile device 102 to take the picture without user intervention when appropriate visual criteria are met.

In 408, authorization engine 109 may receive a transmission of the barcode from mobile device 102 via microservice repository 106. In an embodiment, mobile device 102 may transmit only the barcode number and state or country of the government identification card. In another embodiment, mobile device 102 may transmit the photo taken of the government identification card.

In 410, authorization engine 109 may verify the identity of the individual based on the received barcode. In one embodiment, authorization engine 109 may employ a service that receives the barcode and returns uniquely identifying user information associated with the scanned government identification card, e.g., the individual's name, address, date of issuance, etc. In another embodiment, authorization engine 109 may transmit to the service the photograph of the governmental identification card and receive the verifiable information in response. In another embodiment, authorization engine 109 may process the image of the governmental identification card internally via services in micro-service repository 106. Across these embodiments, authorization engine 109 may next compare the information associated with the governmental identification card to stored information about the account holder to further verify the identity of the transactor. If the two sets of data match, then the account holder has successfully verified their identity via the governmental-identification-card-scanning secondary authentication method.

In 412, authorization engine 109 may determine if the secondary authentication method determined in 402 requires the creation and verification of a one-time passcode. If yes, then method 400 proceeds to 414. Otherwise, method 400 proceeds to 420.

In 414, authorization engine 109 may verify phone ownership of the account holder. In an embodiment, authorization engine 109 may use information stored in cardless services 108 about the account holder and employ a service provided in micro-service repository 106 to verify the phone ownership and determine an appropriate phone number associated with the account holder. In an alternate embodiment, authorization engine 109 may employ a service to verify the phone number and phone ownership. Thus, authorization engine 109 may verify that a phone number associated with an account holder corresponds to a mobile device owned by that account holder.

In 416, authorization engine 109 may send a one-time passcode to the phone number verified in step 414. Authorization engine 109 may generate the one-time passcode internally via a service in micro-service repository 106. In another embodiment, authorization engine 109 may employ a security service to generate and verify the one-time passcodes. One illustrative embodiment describing the reception of such one-time passcode on the mobile application is characterized with reference to FIG. 2I. Mobile device 102 may receive the one-time passcode via SMS or other suitable messaging or communication protocol. In response, the account holder may enter the one-time passcode into the mobile application. One exemplary screenshot for entering the one-time passcode is provided in FIG. 2J.

In 418, authorization engine 109 may receive the response from the account holder and verify that the received one-time passcode matches the one-time passcode sent in 416. If the one-time passcodes match, then the account holder has successfully verified their identity via this secondary authentication method. In other embodiments, authorization may employ a service or a service in micro-service repository 106 to conduct the verification of the one-time passcode. In such embodiments, authorization engine 109 may receive a success/failure indicator from the service.

In 420, authorization engine 109 may determine if the secondary authentication method determined in 402 requires providing security questions to the account holder and receiving and verifying answers to those questions. If yes, then method 400 proceeds to 422. Otherwise, method 400 proceeds to 426.

In 422, authorization engine 109 may send stored security questions to the account holder using mobile device 102. Authorization engine 109 may catalog appropriate answers to the stored security questions, with the answers having been received from the account holder during previous configurations. In an alternate embodiment, authorization engine 109 may employ a service to maintain information that is available for the account holder in publically accessible locations (e.g., searchable web pages). In this embodiment, questions may be framed regarding the publically available information.

In 424, authorization engine 109 may receive answers to the sent security questions from mobile device 102. Authorization engine 109 may compare the received answers to the stored answers. If the two sets match, then the account holder has successfully verified their identity via this secondary authentication method.

In 426, authorization engine 109 may determine if the secondary authentication method determined in 402 requires receiving biometric or geospatial data and comparing the received biometric or geospatial data to stored values. If yes, then method 400 proceeds to 428. Otherwise, method 400 proceeds to 432.

In 428, authorization engine 109 may receive additional biometric or geospatial data from the account holder. Biometric data may be fingerprints, retinal scans, facial maps, and other suitable biometric information. Geospatial information may be positional, locational, or coordinate data or other indication of a particular account holder's current location.

In 430, authorization engine 109 may compare the biometric/geospatial information received in 428 to stored information. For example, authorization engine 109 may compare a received fingerprint to stored fingerprints to determine if the fingerprints match. If the two sets match, then the account holder has successfully verified their identity via this secondary authentication method. For geospatial information, authorization engine 109 may compare received locational information to stored information about the account holder, e.g., locations frequently associated with the user such as an office or a home. If the locations match, then authorization engine 109 may verify the identity of the user on the basis of the common location.

In 432, authorization engine 109 may perform another determined, suitable secondary authentication method to confirm the identity of the account holder. For example, in one embodiment, an authenticated account holder may scan a matrixed identifier displayed by ATM 114 using a mobile application mobile device 102 to perform a cardless ATM transaction. In such an embodiment, authorization engine 109 may garner a variety of information about the account holder based on a received ATM identifier, e.g., the current location of the user to compare to stored data and secondarily authenticate the user. Authorization engine 109 may also further employ capabilities of ATM 114 to secondarily authentication the account holder. For instance, ATM 114 may include capabilities to perform a retinal scan or fingerprint scan of the account holder. ATM 114 may also receive an ATM card/pin number from the paired account holder to secondarily authenticate the user. In additional to the cardless ATM scenario, one skilled in the relevant art(s) will appreciate that a variety of additional authentication mechanisms may be employed to verify the account holder's identity in addition to those specifically enumerated above.

Figure 5:
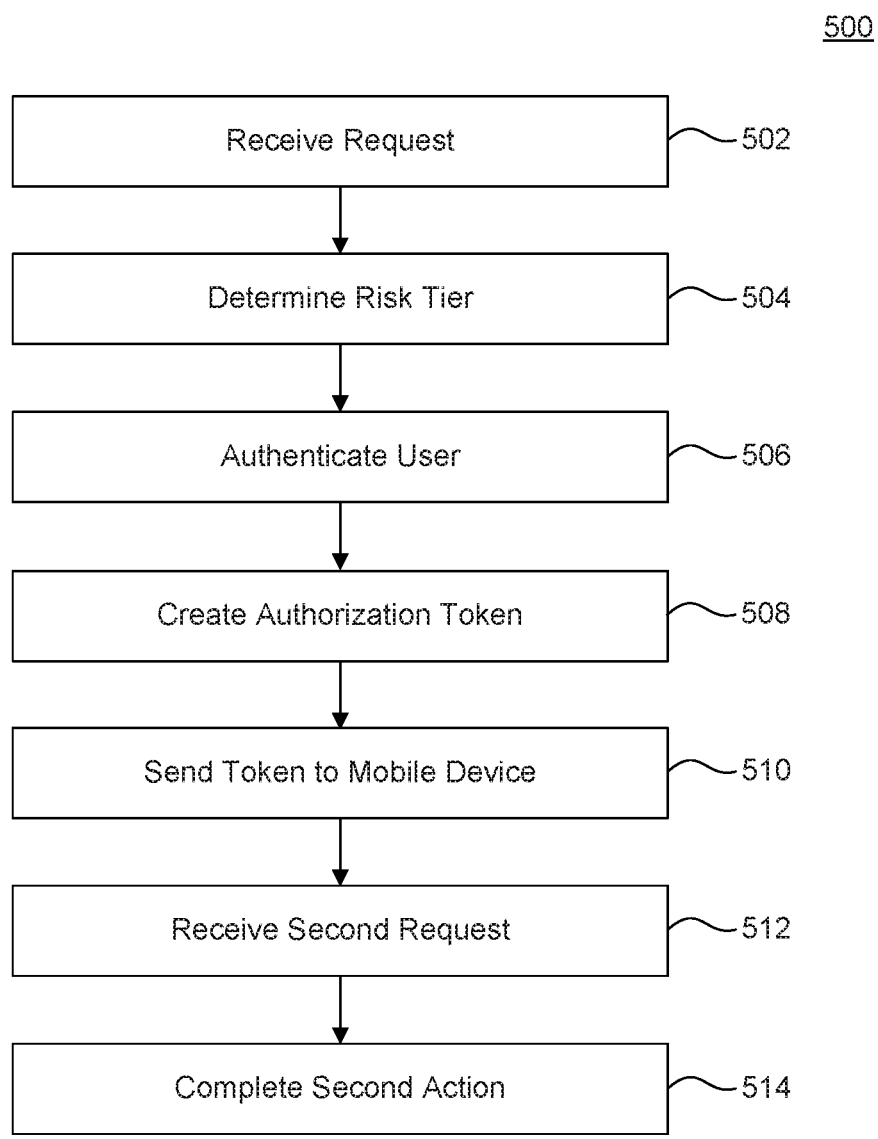
FIG. 5 is a flowchart illustrating a method of authenticating a second request using an authorization token issue in response to first request, in accordance with an embodiment.

FIG. 5 is a flowchart illustrating a method 500 of authentication a second request using an authorization token created in response to first request, in accordance with an embodiment. FIG. 5 presents a more generalized method of authenticating actions performed in a mobile banking application as compared to the specific cardless ATM withdrawal described with reference to FIG. 3. Method 500 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 5, as will be understood by a person of ordinary skill in the art(s).

In 502, cardless services 108 may receive a request to complete an action from mobile device 102 via secure interface 104. In one example, such an action may be logging into the mobile banking application. In such an example, the request may not include an authorization token. However, for the purposes of the method portrayed in FIG. 5, the request received in 502 may be an action that may be completed by a user already authenticated to some degree by authentication engine 109. A previously authenticated user may have access to complete various actions upon logging into the mobile application, e.g., check an account balance, view a statement, transfer funds, etc. The exemplary wireframe in FIG. 2A provides further indication of the actions that are available to an account holder once initially authenticated. Completing a cardless ATM withdrawal may be one such performable action, as described above with reference to FIG. 3. Moreover, in such a scenario, mobile device 102 may have been previously issued an authorization token, e.g., authorization token 103, by authorization server 105. In such a scenario, the received request from mobile device 102 may transmit authorization token 103 along with the request. In other examples, however, an authorization token may be expired or have a token level of zero.

In 504, cardless services 108 may employ risk tier evaluator 111 to determine a risk tier associated with the action specified in the request received in 502. Risk tier evaluator 111 may attribute a level of risk to the action specified in the received request. Risk tier evaluator 111 may assign certain actions a low risk tier, e.g., checking balances, viewing statements, or visiting a frequently-asked questions page on the mobile application. Risk tier evaluator 111 may assign other actions a mid-level risk tier, e.g., transferring funds between accounts, completing cash withdrawals, and cashing checks. Risk tier evaluator 111 may assign still other actions a high risk tier, e.g., closing an account, withdrawing a large amount of funds, and conducting a wire transfer. For example, a user may request to transfer funds between accounts, and risk tier evaluator 111 may determine a risk tier of one for such an action. As described below, other actions may be grouped into a similar risk tier, e.g., cash a check, close an account, conduct a wire transfer, etc.

In 506, cardless services 108 may employ authorization engine 109 to authenticate the user to the level determined in 504. For example, authorization engine 109 may send a user a one-time passcode, send the user security questions, perform one of the other secondary authentication methods described above with reference to FIG. 4, or perform other suitable authentication method. When the user satisfies the requirements of the authentication method, as determined by authentication engine 109, method 500 may proceed to 508.

In 508, cardless services 108 may employ authorization server 105 to issue an authentication token, such as authentication token 103. Authentication token 103 may indicate a token level, i.e., a risk tier of actions that mobile device 102 may conduct. For example, authorization server 105 may issue an OAuth 2.0 access token that indicates the token level.

In 510, authorization server 105 may send the token to mobile device 102 to be stored locally. Authorization token 103 may be stored by mobile device 102 and transmitted when subsequent actions are performed. For example, authorization token 103 may be stored in a database table or local file on mobile device 102.

In 512, cardless services 108 may receive a second request to complete a second action available within the online banking application. For example, the second request may be a request to cash a check. If cashing a check carries a risk tier similar to the transfer requested in step 502, then cardless services 108 may complete the cashing of the check without requiring a mobile device user to re-authenticate. To do so, cardless services 108 may receive authorization token 103 in the second request and determine the token level indicated by authorization token 103. The request to complete the action may leverage micro-services within microservice repository 106 and other services to complete the requested action.

In 514, cardless services 108 may complete the action specified in the received request. For example, cardless services 108 may harness functions provided by microservice repository 106 that allow the cashing of a check via a mobile application. In this fashion, a mobile device user need not authenticate twice to perform actions of a similar risk tier, i.e., actions that may be performed by a user having the requisite token level.

Figure 6:
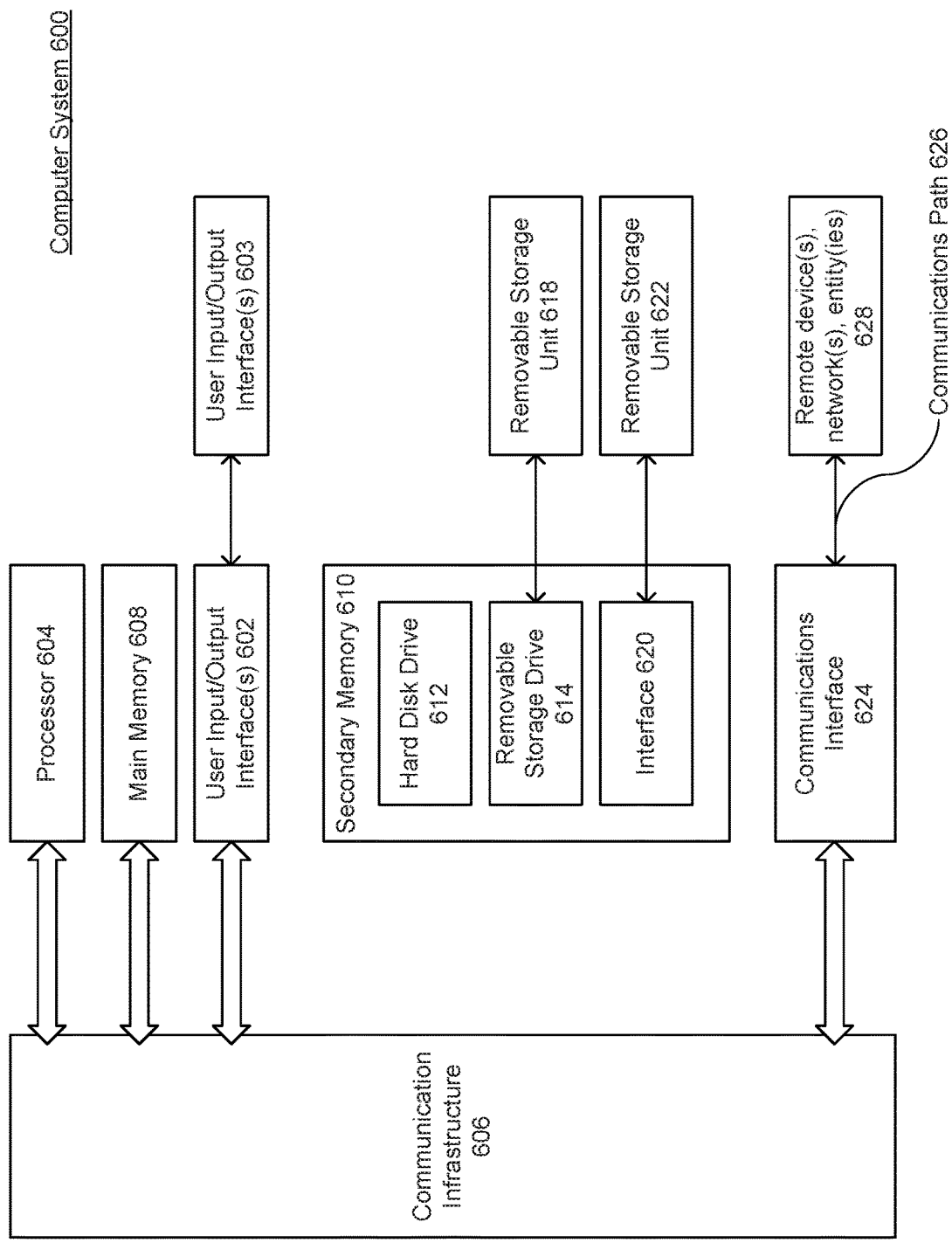
FIG. 6 is an example computer system useful for implementing various embodiments.

Various embodiments may be implemented, for example, using one or more well-known computer systems, such as computer system 600 shown in FIG. 6. One or more computer systems 600 may be used, for example, to implement any of the embodiments discussed herein, as well as combinations and sub-combinations thereof.

Computer system 600 may include one or more processors (also called central processing units, or CPUs), such as a processor 604. Processor 604 may be connected to a communication infrastructure or bus 606.

Computer system 600 may also include user input/output device(s) 608, such as monitors, keyboards, pointing devices, etc., which may communicate with communication infrastructure 606 through user input/output interface(s) 602.

One or more of processors 604 may be a graphics processing unit (GPU). In an embodiment, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 600 may also include a main or primary memory 608, such as random access memory (RAM). Main memory 608 may include one or more levels of cache. Main memory 608 may have stored therein control logic (i.e., computer software) and/or data.

Computer system 600 may also include one or more secondary storage devices or memory 610. Secondary memory 610 may include, for example, a hard disk drive 612 and/or a removable storage device or drive 614. Removable storage drive 614 may be a floppy disk drive, a magnetic tape drive, a compact disk drive, an optical storage device, tape backup device, and/or any other storage device/drive.

Removable storage drive 614 may interact with a removable storage unit 618.

Removable storage unit 618 may include a computer usable or readable storage device having stored thereon computer software (control logic) and/or data. Removable storage unit 618 may be a floppy disk, magnetic tape, compact disk, DVD, optical storage disk, and/any other computer data storage device. Removable storage drive 614 may read from and/or write to removable storage unit 618.

Secondary memory 610 may include other means, devices, components, instrumentalities or other approaches for allowing computer programs and/or other instructions and/or data to be accessed by computer system 600. Such means, devices, components, instrumentalities or other approaches may include, for example, a removable storage unit 622 and an interface 620. Examples of the removable storage unit 622 and the interface 620 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 600 may further include a communication or network interface 624. Communication interface 624 may enable computer system 600 to communicate and interact with any combination of external devices, external networks, external entities, etc. (individually and collectively referenced by reference number 628). For example, communication interface 624 may allow computer system 600 to communicate with external or remote devices 628 over communications path 626, which may be wired and/or wireless (or a combination thereof), and which may include any combination of LANs, WANs, the Internet, etc. Control logic and/or data may be transmitted to and from computer system 600 via communication path 626.

Computer system 600 may also be any of a personal digital assistant (PDA), desktop workstation, laptop or notebook computer, netbook, tablet, smart phone, smart watch or other wearable, appliance, part of the Internet-of-Things, and/or embedded system, to name a few non-limiting examples, or any combination thereof.

Computer system 600 may be a client or server, accessing or hosting any applications and/or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in computer system 600 may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats or schemas may be used, either exclusively or in combination with known or open standards.

In some embodiments, a tangible, non-transitory apparatus or article of manufacture comprising a tangible, non-transitory computer useable or readable medium having control logic (software) stored thereon may also be referred to herein as a computer program product or program storage device. This includes, but is not limited to, computer system 600, main memory 608, secondary memory 610, and removable storage units 618 and 622, as well as tangible articles of manufacture embodying any combination of the foregoing. Such control logic, when executed by one or more data processing devices (such as computer system 600), may cause such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 6. In particular, embodiments can operate with software, hardware, and/or operating system implementations other than those described herein.

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary embodiments, but should be defined only in accordance with the following claims and their equivalents.

What is claimed is:

1. A computer implemented method, comprising:
   receiving, by one or more computing devices, a request from a mobile device user on a mobile application on a mobile device to perform an action;
   determining, by the one or more computing devices, a token level required by the action, wherein the token level is determined based on financial transactions performed in the past by the mobile device user;
   authenticating, by the one or more computing devices, the mobile device user using an authentication method based on the token level;
   creating, by the one or more computing devices, an authorization token that associates the mobile device with the token level, wherein the authorization token remains in effect for a certain amount of time that varies based on the token level;
   sending, by the one or more computing devices, the authorization token to the mobile device;
   receiving, by the one or more computing devices, a second request from the mobile device user on the mobile application on the mobile device to perform a second action, wherein the second action invokes a service, wherein the second request comprises the authorization token and an identifier associated with an automated teller machine (ATM), and wherein the identifier is encoded in a matrixed identifier displayed on the ATM that the mobile device scans using a view-finder screen activated in the mobile application;
   causing, by the one or more computing devices, the service to verify that the token level in the authorization token is sufficient to perform the second action and issue instructions to the ATM to cause the ATM to complete the second action; and
   causing, by the one or more computing devices, the mobile application to display a confirmation screen indicating that the ATM completed the second action.

2. The computer implemented method of claim 1, wherein the second action is a cash withdrawal.

3. The computer implemented method of claim 1, further comprising:
   determining, by the one or more computing devices, a second token level required by the second action; and
   authenticating, by the one or more computing devices, the mobile device user using a secondary authentication method when the second token level is greater than the token level.

4. The computer implemented method of claim 1, the determining the token level further comprising:
   calculating, by the one more computing devices, a drainage indicator based on actions performed in the past by the mobile device user, wherein the drainage indicator comprises a total value of past withdrawals;
   calculating, by the one more computing devices, a velocity indicator based on the actions performed in the past by the mobile device user, wherein the velocity indicator comprises a count of past withdrawals; and
   determining, by the one or more computing devices, the token level based on the drainage indicator and the velocity indicator.

5. The computer implemented method of claim 1, the authenticating the mobile device user further comprising:
   verifying, by the one or more computing devices, that the mobile device user owns the mobile device through a verification micro-service;
   sending, by the one or more computing devices, a message to the mobile device containing a one-time passcode; and
   receiving, by the one or more computing devices, a response from the mobile device containing the one-time passcode.

6. The computer implemented method of claim 1, the authenticating the mobile device user further comprising:
   activating, by the one or more computing devices, a view-finder screen on the mobile device that allows the mobile device user to scan a barcode on a government identification; and
   sending, by the one or more computing devices, the barcode to a verification service that confirms the identity of the mobile device user.

7. The computer implemented method of claim 1, the authenticating the mobile device user further comprising:
   determining, by the one or more computing devices, a location associated with the mobile device user; and
   comparing, by the one or more computing devices, the location to a list of past locations associated with the mobile device user to confirm the identity of the mobile device user.

8. The computer implemented method of claim 1, the authenticating the mobile device user further comprising:
   receiving, by the one or more computing devices, biometric information in a response from the mobile device; and
   comparing, by the one or more computing devices, the biometric information to stored biometric information for the mobile device user to confirm the identity of the mobile device user.

9. The computer implemented method of claim 1, the authenticating the mobile device user further comprising:
   sending, by the one or more computing devices, a security screen comprising a question for the mobile device user to answer;
   receiving, by the one or more computing devices, a response to the question; and
   comparing, by the one or more computing devices, the response to a stored response for the question to confirm the identity of the mobile device user.

10. The computer implemented method of claim 1, the authenticating the mobile device user further comprising:

receiving, by the one or more computing devices, a login and a password from the mobile device user; and verifying, by the one or more computing devices, the authenticity of the mobile device user with the login and the password.

11. A system, comprising:

a memory configured to store operations; and at least one processor coupled to the memory and configured to:

receive a request from a mobile device user on a mobile application on a mobile device to perform an action;

determine a token level required by the action, wherein the token level is determined based on financial transactions performed in the past by the mobile device user;

authenticate the mobile device user using an authentication method based on the token level;

create an authorization token that associates the mobile device with the token level, wherein the authorization token remains in effect for a certain amount of time that varies based on the token level;

send the authorization token to the mobile device;

receive a second request from the mobile device user on the mobile application on the mobile device to perform a second action, wherein the second action invokes a service, wherein the second request comprises the authorization token and an identifier associated with an automated teller machine (ATM), and wherein the identifier is encoded in a matrixed identifier displayed on the ATM that the mobile device scans using a view-finder screen activated in the mobile application;

cause the service to verify that the token level in the authorization token is sufficient to perform the second action and issue instructions to the ATM that cause the ATM to complete the second action; and cause the mobile application to display a confirmation screen indicating that the ATM completed the second action.

12. The system of claim 11, wherein the second action is a cash withdrawal.

13. The system of claim 11, the at least one processor further configured to:

determine a second token level required by the second action; and authenticate the mobile device user using a secondary authentication method when the second token level is greater than the token level.

14. The system of claim 11, wherein to authenticate the mobile device user the at least one processor is further configured to:

verify that the mobile device user owns the mobile device through a verification micro-service;

send a message to the mobile device containing a one-time passcode; and receive a response from the mobile device containing the one-time passcode.

15. The system of claim 11, wherein to authenticate the mobile device user the at least one processor is further configured to:

activate a view-finder screen on the mobile device that allows the mobile device user to scan a barcode on a government identification; and send the barcode to a verification service that confirms the identity of the mobile device user.

16. The system of claim 11, wherein to authenticate the mobile device user the at least one processor is further configured to:

determine a location associated with the mobile device user; and compare the location to a list of past locations associated with the mobile device user to confirm the identity of the mobile device user.

17. The system of claim 11, wherein to authenticate the mobile device user the at least one processor is further configured to:

receive biometric information in a response from the mobile device; and compare the biometric information to stored biometric information for the mobile device user to confirm the identity of the mobile device user.

18. The system of claim 11, wherein to authenticate the mobile device user the at least one processor is further configured to:

send a security screen comprising a question for the mobile device user to answer;

receive a response to the question; and compare the response to a stored response for the question to confirm the identity of the mobile device user.

19. A non-transitory computer-readable device having instructions stored thereon that, when executed by at least one computing device, cause the at least one computing device to perform operations comprising:

receiving a request from a mobile device user on a mobile application on a mobile device to perform an action;

determining a token level required by the action, wherein the token level is determined based on financial transactions performed in the past by the mobile device user;

authenticating the mobile device user using an authentication method based on the token level;

creating an authorization token that associates the mobile device with the token level, wherein the authorization token remains in effect for a certain amount of time that varies based on the token level;

sending the authorization token to the mobile device;

receiving a second request from the mobile device user on the mobile application on the mobile device to perform a second action, wherein the second action invokes a service, wherein the second request comprises the authorization token and an identifier associated with an automated teller machine (ATM), and wherein the identifier is encoded in a matrixed identifier displayed on the ATM that the mobile device scans using a view-finder screen activated in the mobile application;

causing the service to verify that the token level in the authorization token is sufficient to perform the second action and issue instructions to the ATM that cause the ATM to complete the second action; and causing the mobile application to display a confirmation screen indicating that the ATM completed the second action.

20. The non-transitory computer-readable device of claim 19, wherein the second action is a cash withdrawal.

* * * * *